Dec. 2, 1958 W. F. ENGEL ET AL 2,862,278
PROCESS FOR PREPARING IMPROVED CATALYSTS MOULDED
INTO PIECES OR CARRIERS THEREFOR
Filed July 21, 1954
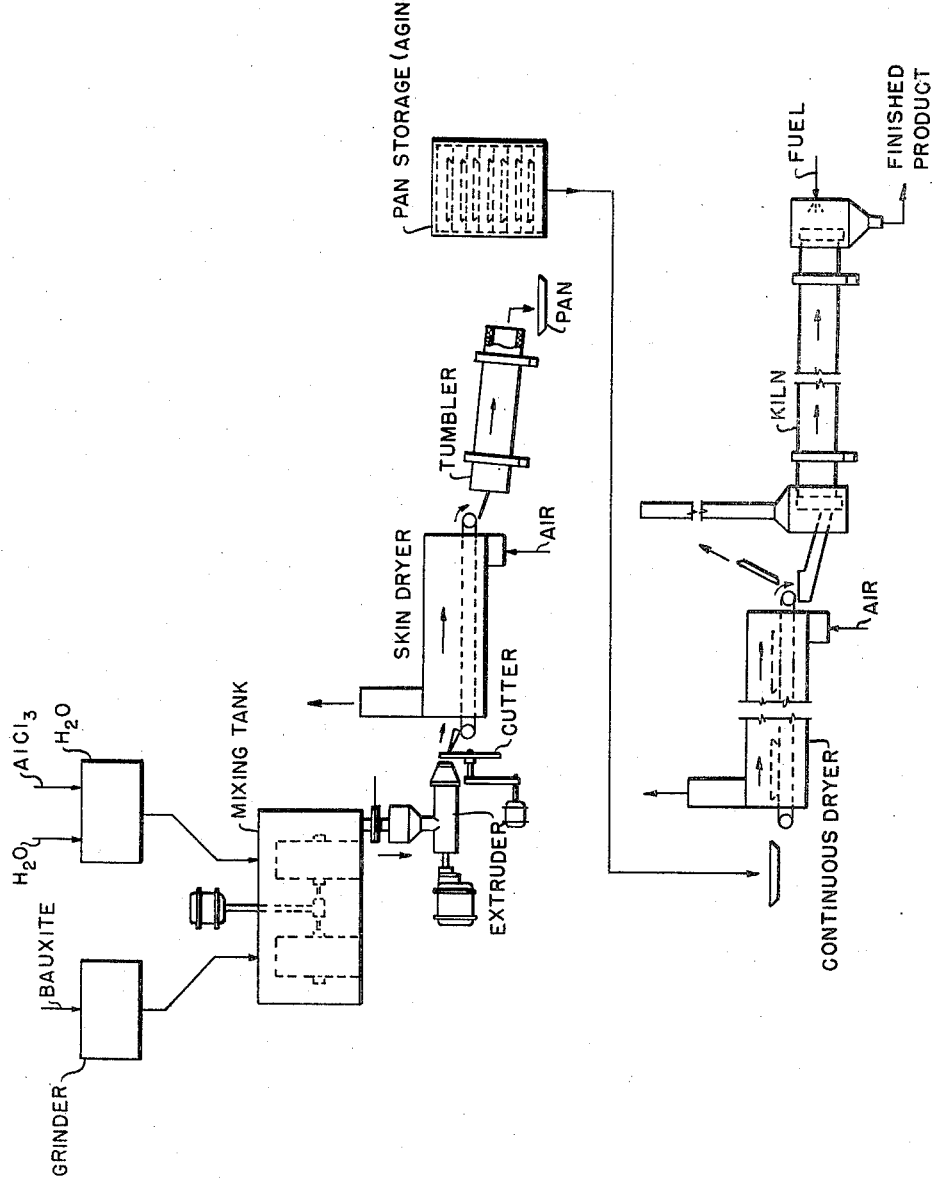
INVENTORS:
WILLEM FREDERIK ENGEL
PIETER KRIJGER
BY *James Todorovic*
THEIR ATTORNEY

United States Patent Office 2,862,278
Patented Dec. 2, 1958

2,862,278

PROCESS FOR PREPARING IMPROVED CATALYSTS MOULDED INTO PIECES OR CARRIERS THEREFOR

Willem Frederik Engel and Pieter Krijger, Amsterdam, Netherlands, assignors to Shell Development Company, New York, N. Y., a corporation of Delaware Application July 21, 1954, Serial No. 444,736

Claims priority, application Netherlands December 28, 1951

3 Claims. (Cl. 25—156)

This invention relates to a process for preparing improved catalysts moulded into pieces and carriers for such catalysts. More particularly the invention relates to an improvement in the process for preparing formed micro-porous pellets of solid catalysts, or carrier pellets which are to be converted into catalysts by impregnation with various catalytic promoters.

It is common practice to employ various solid catalysts in the form of porous pieces of the approximate desired size. The main problems encountered in providing such pieces are (1) the problem of preparing pieces which are sufficiently strong mechanically to withstand handling and normal use with a minimum production of powder; (2) the problem of preparing suitable pieces in an economical and practical manner; (3) the problem of preparing suitable pieces with a minimum waste of material. In certain cases these problems are adequately solved by known methods, but in other cases they are not.

The catalyst pieces are usually in the form of fragments, cast pieces, or tabletted pieces. Fragments produced by crushing and/or breaking larger pieces are suitable in some cases but in the case of most materials one or more of the following difficulties is encountered: (1) the material does not exist in pieces that can be crushed or broken, e. g., kieselguhr; (2) the crushed fragments have poor mechanical strength, e. g., silica gel; (3) there is a large waste in the formation of undersized particles; (4) the particles are irregular in shape and do not pack well.

Cast pieces are generally more satisfactory in the few cases where casting can be applied but suffer from the following disadvantages: (1) the production cost is high; (2) there is considerable loss of material due to splitting of imperfect and stressed pieces.

Pressed pellets have the advantage of being of a desired uniform size and shape. They can generally be prepared at a reasonable cost with little waste of material. However, it is often difficult or impossible to prepare pieces of suitable mechanical strength.

There are two general methods for preparing pressed pellets. In the first method the material is simply pressed into tablets in a punch and die machine such, for example, as the well known Stoke's pelleting machine. This method is often satisfactory but is usually quite costly as the production capacity is low and the punches and dies must be frequently replaced. The most economical method is by extrusion. In this method the material is pressed through orifices of an extrusion machine and the extrudate is cut or broken into lengths of the desired size. Such extrusion machines are simple and are capable of large production capacity. The present invention relates to the preparation of pellets by this latter or extrusion method.

In the preparation of pellets by the extrusion technique the powdered raw material is generally wetted with sufficient liquid to form an extrudable mix. The amount of liquid varies from case to case depending upon the character of the powder but for any given case is fairly critical. If insufficient liquid is used, the mix cannot be extruded. If an excess of liquid is used, the pellets stick together. In order to produce pellets of higher porosity, it has been suggested to employ more than the usual amount of liquid and then to subject the extrudate to a hot blast for a very short time sufficient to form a non-sticky skin. See, for example, Netherlands Patent No. 63,336.

The strength of catalyst pellets is usually measured by determining the maximum weight an average pellet will support without crushing. The pellets produced by the prior extrusion methods generally have a fair mechanical strength as measured by this test. In use, however, such extruded pellets generally do not show up as well as the measured strength would lead one to expect. This is due to the fact that although the average pellet is capable of supporting a considerable load without crushing, the sharp edges are quite friable. In use a considerable amount of powder is formed even though the pellets are not crushed. This powder increases the pressure drop through the bed, causes channeling, and often leads to complete plugging of the bed. When this happens, it is necessary to replace the catalyst or to remove it and sieve it to remove the fines.

In order to overcome this tendency for the pellets to form powder, it has been suggested to subject the finished pellets to mechanical wear to knock or wear off the friable edges. It has been suggested, for example, to tumble the calcined pellets for a time in a revolving drum until the friable edges are removed. This is effective but has two disadvantages. In the first place, it is found that the fine powder which is formed tends to stick to the pellets and to fill up and clog many of the pores in the pellets. In the second place, the method is wasteful of material since as much as 25% of the pelleted material may be reduced to a powder which is difficult or impossible to rework into strong pellets.

It has now been found that the mentioned difficulties can be overcome and strong non-friable pellets can be produced without loss or reworking of material if the pellets, produced from a mix of sufficient liquid content to be plastic, are annealed after subjecting them to only a very light mechanical deformation to remove the sharp edges. However, suitable pellets are only produced if certain precautions are taken.

The method is applicable for the production of pressed formed pieces of any desired size from about 2 mm. average diameter up to about 25 mm. average diameter by the pressure extrusion of a moist mass of any powder. It is particularly suitable for forming pressed pellets of alumina or bauxite. The process is particularly suited, for example, in the production of strong non-dusting pellets of bauxite which are subsequently impregnated with various catalytic promoters, e. g., cobalt and/or molybdenum oxides, in the production catalysts of various types.

It is necessary that the pellets be formed by pressure extrusion of a moist mix and subsequent cutting of the extrudate into suitable lengths. Simple balling of the moist mix does not apply the high pressure necessary to produce strong pellets.

It is also necessary to apply somewhat more liquid than the minimum amount required to produce extruded pellets. In normal extrusion the amount of liquid is preferably held near the minimum affording an extrudable mix, in order to produce non-sticky pellets. This amount of liquid is not always sufficient to produce pellets which can be deformed and, if such pellets are deformed, it is found that the strength of the calcined pellets is greatly decreased. In order that the pellets may be deformed without a prohibitive loss of strength, it is necessary to employ such amounts of liquid that sticky pellets may be produced, i. e., the extrudate as it issues from the orifice of the die plate will stick (weld) upon casual contact with itself. The sticky extrudate is cut into pellets by a knife, e. g., a revolving cutter blade or a moving wire, which is preferably wet with water. It is preferable to employ a little soap or synthetic detergent, e. g., sodium sulfonates, in the water used to moisten the cutter.

After cutting, the pellets are subjected to a very superficial drying (skin drying) while retaining them out of contact with one another. By skin drying after cutting, instead of before cutting, the entire surface of the pellet is skin dried. If the drying is carried out prior to cutting, the freshly cut ends remain sticky. The skin drying may be effected by a blast of hot air or steam or by simply allowing the pellets to stand in the open for a time either at room temperature or in a heated atmosphere, e. g., 100–200° C. While the drying may require several hours at room temperature, it may be completed in less than three minutes, e. g., 5–200 seconds, if a hot drying atmosphere is provided.

The discussed drying is called superficial drying or skin drying, because the purpose is to dry only the outer skin of the pellets sufficiently to render them non-sticky. The actual amount of moisture removed is only a very small part of the total moisture content of the pellet, i. e., not more than 1% loss in weight. It is essential that the drying be carried out only to the extent necessary to allow the pellets to be contacted, e. g., by tumbling, without sticking together. The conditions specified produce green pellets which do not adhere to each other, but which still contain sufficient fluid to permit deformation by light pressure as by tumbling. If the drying is carried out beyond the stage indicated, the interior of the pellets begins to dry and quickly passes out of the plastic stage.

The skin dried green pellets of still high moisture content are next deformed by light mechanical pressure. The deformation is only sufficient to round off the sharp edges. Excessive deformation brings interior moisture to the surface and furthermore results in weak pellets. Thus the cylindrical pellets are deformed only to round off the sharp edges. The deformed pellets are therefore in no sense rounded into balls but have a shape resembling a barrel. Although other methods for lightly rounding the green pellets may be used, we find that a suitable light deformation without production of fines may be obtained by passing the green skin dried pellets through a revolving drum. Thus, the superficially dried pellets can be passed through a sloping drum which is slowly revolved. Another suitable method is to allow the superficially dried pellets to roll down an inclined plane which is provided with baffles so that the pellets are forced to take a zig-zag path.

During the rounding off of the sharp edges, some further drying of the pellets can, if desired, be carried out. For example, hot gases may be passed through the revolving drum during the tumbling. Such drying if carried out should not be sufficient to render the pellets non-plastic.

After having the sharp edges rounded, the green pellets are aged (annealed), dried, and then finally calcined, e. g., at about 500° C. to remove water of hydration and create the desired high surface, micro-porous condition.

If the green skin dried and deformed pellets are passed directly to the drying and calcining step, the resulting pellets are rather weak even though the deformation was small. If, on the other hand, the deformed green pellets are allowed to age prior to drying, some sort of tempering or annealing takes place so that strong pellets are obtained. Since the pellets at this stage are still plastic and contain essentially the original water content, they are deformed and tend to weld if subjected to any appreciable pressure, such, for instance, as would result if the pellets were placed in barrels or in a bin. It is therefore necessary to age the pellets in shallow containers such as pans or trays in layers not more than about 5 cm. deep. The annealing is carried out at room temperature or thereabout. An annealing period of about two hours is found to be sufficient but any longer time can also be applied.

After the pellets have been annealed, they are dried, e. g., at 120° C. and then calcined. The calcination is carried out at a temperature sufficiently high to drive out substantially all of the combined water but below that causing any sintering, fusion, or transformation of the alumina to the alpha (corundum) form. A temperature of about 500° C. is suitable. This gives a product having the desired micro-porous structure affording an available surface of over 100 m.$^2$/g.

The process is illustrated in the accompanying drawing. Referring to the drawing, the ground bauxite and aqueous solution of aluminum chloride are passed to the mixing tank where they are mixed to produce a stiff paste. The paste passes to the extruder and issues therefrom in the form of rods which are cut by the cutter into cylindrical pellets. The pellets, which are sticky, are continuously passed through a short oven, called a "skin drier," where they are dried with hot air only enough to prevent them from sticking. The skin dried pellets then pass through the short tumbling drum to round off the sharp edges of the cylindrical pellets. The tumbled pellets are collected in shallow trays and aged. After a suitable ageing period, which is at least two hours, the pans with the pellets are passed through the drier and then the dried pellets are dumped into the kiln where they are fired to produce the finished product.

The process of the invention is illustrated by the following example:

Surinam bauxite in the form in which it is obtained commercially, i. e., having a loss of ignition of about 30%, was powdered and sieved. The powder was kneaded for about 15 minutes with 14.6% by weight of water containing 4.2% by weight of aluminum chloride ($AlCl_3$) based on the bauxite. The resulting paste was extruded into a strand 8 mm. in diameter by means of an extrusion press. The sticky extrudate issuing from the press orifices was cut into pellets 8 mm. in length by means of a rotating knife which was maintained moist by passing it through a vessel containing water. The cut green pellets were allowed to fall directly to a conveyer belt which moved at such a rate that the pellets remained out of contact with one another. The conveyer belt containing the green pellets was passed through a skin drying chamber through which air was passed at a temperature of about 160° C. The speed of the conveyer belt was such that the average drying period for each particle was about 9 seconds. During this superficial drying, the moisture content was reduced only 0.5%. A portion of the green catalyst pellets was removed and annealed for 2 hours and at room temperature in shallow trays (4 cm. deep) before being dried and then calcined at 500° C. for 2 hours.

Another portion of the skin dried green pellets was passed through a drum 20 cm. in diameter and 150 cm. in length, the interior of which was provided for the first 64 cm. with flutes running parallel to the longitudinal axis of the drum. There were 27 flutes per dm. each flute being 1 mm. high. The drum was at an angle of 5° from the horizontal and was revolved at a rate of 95 revolutions per minute. The residence time of the pellets in the drum was about 20 seconds. The temperature in the drum varied from about 110° C. to about 150° C. The green pellets issuing from the molding drum were free of sharp edges and slightly rounded. One portion of the thus slightly deformed green pellets was passed directly to a drier and then was calcined for two hours at 500° C. The other portion of the slightly deformed green pellets was withdrawn from the production line and annealed at room temperature for a period of two hours in shallow trays (4 cm. deep); it was then dried and calcined for two hours at 500° C.

The drying was effected by heating the green pellets at 120° C. for 8 hours (which removed practically all of the added moisture) and then heating at 250° C. for 3 hours (which removed part of the water of constitution). The calcination was effected by raising the temperature to 500° C. during the course of about 2 hours and maintaining this temperature for an additional 2 hours.

The pellets were tested for pellet strength and for their tendency to produce powder when subjected to mechanical stress. This latter test was carried out by placing 20 cubic centimeters of the pellets in a cylindrical vessel having a flat smooth bottom of 6 square centimeters area and placing a close fitting flat plate in the cylindrical vessel on top of the pellets. Weights were placed on the cylindrical plate and allowed to rest for 3 minutes for each test. The quantity of powder which was formed was measured by sieving and weighing. The total quantities of powder which were formed during the successive tests are shown in the following table:

| Pressure (Weight) | Non-Rounded Pellets Annealed 2 Hours After Skin Drying | Pellets Dried and Calcined Directly After Tumbling | Pellets Annealed 2 Hours After Tumbling |
|---|---|---|---|
| 20 kg./6 cm² ---- percent by weight-- | 0.06 | 0.06 | 0.03 |
| 40 kg./6 cm² ---------------- do---- | 0.16 | 0.13 | 0.08 |
| 60 kg./6 cm² ---------------- do---- | 0.60 | 0.55 | 0.30 |
| 80 kg./6 cm² ---------------- do---- | 1.20 | 1.65 | 0.60 |
| 100 kg./6 cm² --------------- do---- | 2.30 | 4.00 | 1.50 |
| Pellet Strength --------- kilogram-- | 16 | 1$ | 17 |

The data given are averages of at least 10 determinations. In the particular example over 200 kilograms of pellets were produced.

The above data illustrate the adverse effect of even minor deformation of the green catalyst and the decided beneficial effect when such deformation to remove the sharp edges is followed by an annealing period prior to drying the pellets.

This application is a continuation in part of our co-pending application, Serial Number 289,906, filed May 24, 1952, now abandoned which, in turn, is based on our Netherland patent application, Serial Number 166,377, filed December 28, 1951.

We claim as our invention:

1. In the production of micro-porous pressed catalyst pellets by extrusion of a moist powdered alumina the combination of steps which comprises drying the cut green extruded sticky pellets superficially and only to the extent necessary to prevent them from sticking together upon tumbling, tumbling the superficially dried but still plastic pellets only to the extent to remove the sharp edges, aging the tumbled pellets in layers less than about 5 cm. deep for a time of at least 2 hours at about room temperature and ambient humidity, whereby substantially no change in water content occurs and internal stresses are relieved, and then drying and calcining the pellets at a temperature of about 500° C. to produce pellets having a micro-porous structure and having none of the alumina originally present therein converted to alpha alumina.

2. In the production of pressed micro-porous catalyst pellets the combination of process steps which comprises mixing powdered bauxite with sufficient aqueous solution of aluminum chloride that the pellets produced upon extruding paste will stick together on contact, extruding the resulting moisture mixture, cutting the extrudate into pellets, drying the cut green pellets superficially only to the extent necessary to prevent them from sticking together upon tumbling by removing no more than 1% of water, based on the total weight, tumbling the superficially dried pellets only until the edges are rounded, aging the tumbled pellets in layers less than about 5 cm. deep for at least 2 hours at about room temperature and ambient humidity, whereby substantially no change in water content occurs and internal stresses are relieved, and then drying and calcining the pellets at a temperature of about 500° C. to produce pellets having a micro-porous structure, with a surface area in excess of 100 m.²/g. and having none of the alumina originally present therein converted to alpha alumina.

3. Catalyst pellets produced by a process according to claim 2.

References Cited in the file of this patent
UNITED STATES PATENTS

| | | |
|---|---|---|
| 2,256,033 | McLachlan | Sept. 16, 1941 |
| 2,399,225 | Heany | Apr. 30, 1946 |
| 2,630,616 | Robinson | Mar. 10, 1953 |